Nov. 17, 1925.
S. G. DOWN
1,561,701
BRAKE SHOE CONSTRUCTION
Filed Nov. 1, 1923
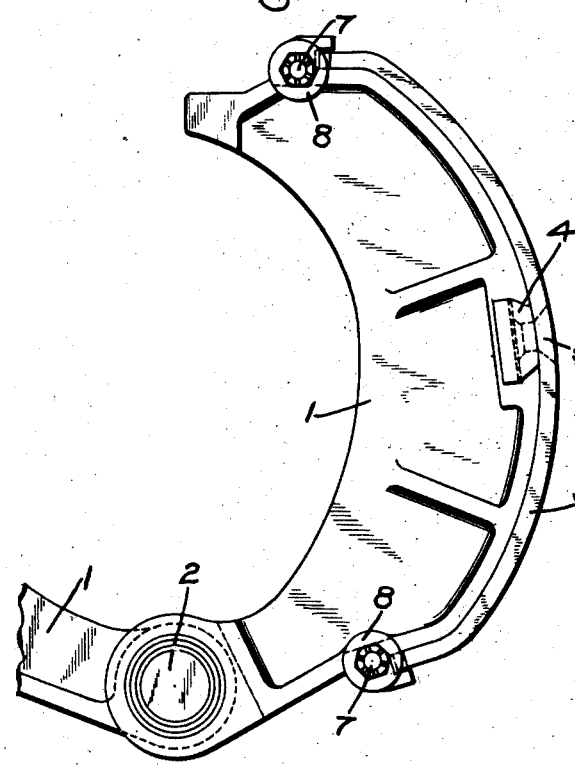
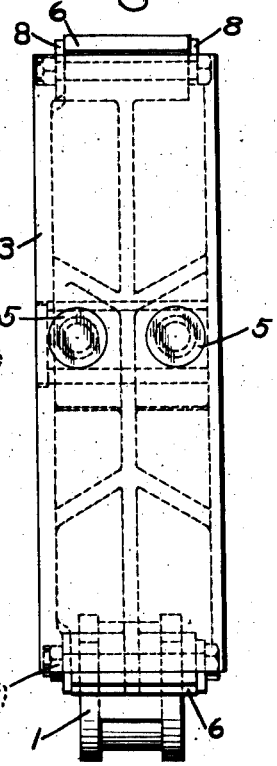
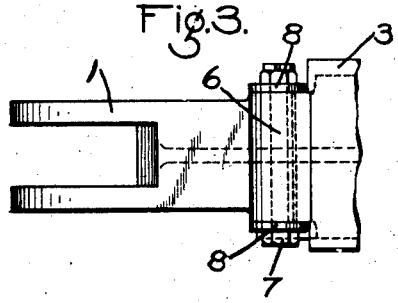
INVENTOR
SIDNEY G. DOWN
BY Wm. N. Cady
ATTORNEY Patented Nov. 17, 1925.

1,561,701

UNITED STATES PATENT OFFICE.

SIDNEY G. DOWN, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-SHOE CONSTRUCTION.

Application filed November 1, 1923. Serial No. 672,119.

*To all whom it may concern:*

Be it known that I, SIDNEY G. DOWN, a citizen of the United States, residing at Pittsburgh, in the county of Allegheny and State of Pennsylvania, have invented new and useful Improvements in Brake-Shoe Constructions, of which the following is a specification.

This invention relates to brake shoes, and more particularly to a brake shoe construction adapted for the internal expanding drum type of brake, such as employed on motor vehicles.

The principal object of my invention is to provide an improved brake shoe construction of the above character.

In the accompanying drawing; Fig. 1 is a side elevation of a brake head, showing my improved brake shoe construction applied thereto; Fig. 2 an end elevation of the construction shown in Fig. 1; and Fig. 3 a partial plan view thereof.

As shown in the drawing, brake heads 1 are provided, having arcuate faces for receiving the brake shoe and having a pin 2 for partially connecting the brake heads. Said brake heads are adapted to be expanded by the usual cam device (not shown) so as to engage the internal friction face of the brake drum (not shown).

According to my invention, the brake shoe 3 may comprise a plate bent to conform to the arcuate face of the brake head 1.

Centrally and intermediate the ends, the brake shoe is provided with a transversely arranged dovetail member 4 which may be secured to the shoe by countersunk rivets 5.

The brake head 1 is provided at the opposite ends of the arcuate face with lugs 6 each having a transverse recess adapted to receive the corresponding end of the brake shoe 3. Centrally and intermediate the lugs 6, the brake head is provided with a dovetailed groove, shaped to receive the dovetail member 4.

The brake shoe may be applied and removed by shifting the shoe transversely with respect to the brake head, so that it is not necessary to remove the vehicle wheel for that purpose, and when the brake shoe has been applied to the brake head, the shoe is secured in place by bolts 7, which extend through transverse openings in the lugs 6. The ends of the brake shoe are notched, so that the width of the end which enters the recess in the key is the same as that of the lug 6 and the shoe is prevented from moving laterally by means of washers 8, which engage the notched ends of the brake shoe.

Having now described my invention, what I claim as new and desire to secure by Letters Patent, is:—

1. The combination with a brake head having an arcuate face and provided with a lug at each end of said face having a transverse recess and a transverse dovetail recess intermediate the ends of the arcuate face, of a brake shoe formed to engage said arcuate face and having its opposite ends adapted to engage in said recesses at the ends of the arcuate face of the brake head and having a dovetail member adapted to engage in the dovetail recess in the brake head.

2. The combination with a brake head having an arcuate face and provided with a lug at each end of said face having a transverse recess, of a brake shoe formed to engage said arcuate face and having its opposite ends adapted to engage in said recesses, and a bolt extending through a transverse bore in each lug for securing said shoe in place.

3. The combination with a brake head having an arcuate face and provided with a lug at each end of said face having a transverse recess, of a brake shoe formed to engage said arcuate face and having its opposite ends adapted to engage in said recesses, a bolt extending through a transverse bore in each lug and a washer mounted on said bolt at each side of the lug for engaging said brake shoe.

In testimony whereof I have hereunto set my hand.

SIDNEY G. DOWN.